United States Patent [19]

Bozzo et al.

[11] Patent Number: 4,965,673
[45] Date of Patent: Oct. 23, 1990

[54] APPARATUS FOR A VIDEO RECORDING BOOTH

[75] Inventors: Suzanna D. Bozzo; Ronald W. Thomas, both of Tucson, Ariz.

[73] Assignee: Eyzon Corporation, Tucson, Ariz.

[21] Appl. No.: 253,248

[22] Filed: Oct. 4, 1988

[51] Int. Cl.⁵ .......................................... H04N 5/782
[52] U.S. Cl. ..................................... 358/335; 360/92; 358/185
[58] Field of Search ................ 360/33.1, 92; 358/102, 358/335; 194/217; 364/410, 521, 479, 478; 369/84, 85, 30, 34, 35

[56] References Cited

U.S. PATENT DOCUMENTS

| | | | |
|---|---|---|---|
| 4,621,349 | 11/1986 | Sander | 360/92 |
| 4,688,105 | 8/1987 | Bloch et al. | 358/335 |
| 4,695,903 | 9/1989 | Serap et al. | 358/342 |
| 4,789,907 | 12/1988 | Fischetti | 358/335 |

Primary Examiner—Robert L. Richardson
Attorney, Agent, or Firm—Cahill, Sutton & Thomas

[57] ABSTRACT

A coin actuated television camera, recorder and a supply of blank video cassettes are mounted within a recording booth to produce an audible and visible recording of an occupant of the booth on command. The video cassette containing the recording is dispensed automatically to the occupant on conclusion of the recording session.

30 Claims, 5 Drawing Sheets

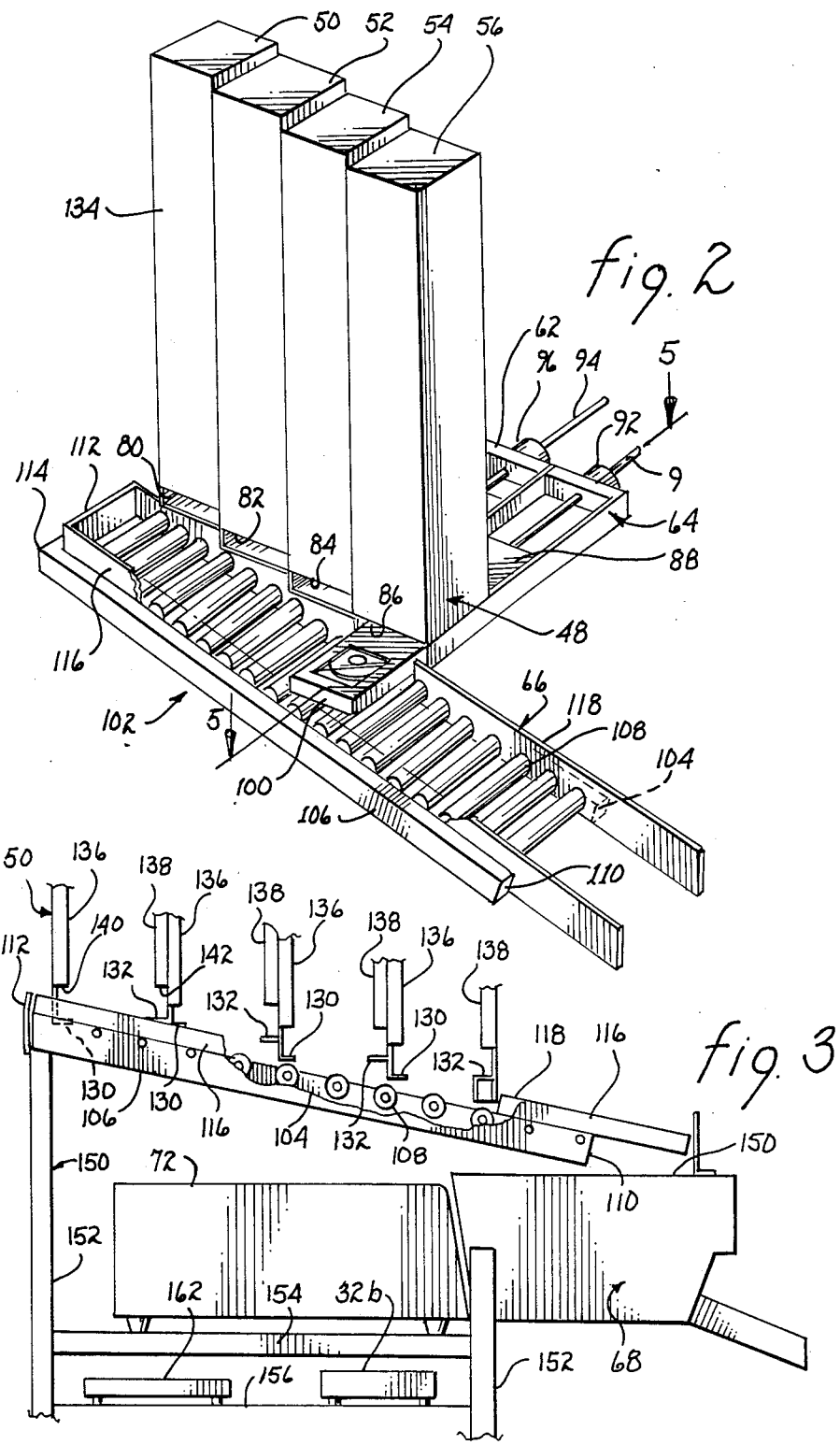

APPARATUS FOR A VIDEO RECORDING BOOTH

BACKGROUND OF THE INVENTION

1. Field of the Invention

The present invention relates to recording booths and, more particularly, to apparatus for making a recording on a video cassette and dispensing the video cassette at the conclusion of a recording session.

2. Description of Prior Art

For years, people have used a professional photographer to obtain high quality portrait photographs. The expenses attendant such photographs are substantial and the services of the photographer are engaged only in conjunction with special occasions. For some, the expenses attendant portrait photography are too great. As a result of the need to provide a source of portrait photographs, photo booths were developed. Such booths permitted an occupant, in return for payment through deposit of coins in a slot, to have his/her photograph taken. Depending upon the nature of the camera equipment used, an exposed print was dispensed shortly thereafter or the exposed print would be mailed to the occupant after the negative had been developed and prints made.

While these photographic prints provided a likeness of the occupant or occupants of a booth, the prints could not be used to convey a message in the nature of correspondence to a third party. Furthermore, the quality of the camera and/or developing process generally produced low quality, marginally acceptable results.

With the rapid development of high quality television cameras, audio equipment and video and audio recorders, the quality of television images and associated sound has increased greatly. In fact, the quality, under proper conditions, approaches that of fine photography. To obtain a video recording, with or without accompanying sound, one can use commercially available video cameras or go to a recording studio. The services provided by a studio are still relatively expensive. The use of television cameras available to the general public and the mean skill level of an owner of such equipment are relatively mediocre. Consequently, any recording produced by a non professional is of questionable technical merit.

SUMMARY OF THE INVENTION

A television camera with audio pickup is mounted within a booth to record an occupant(s) of the booth for a period of time commensurate with the dictates of a coin actuated mechanism. On completion of the recording session, the video cassette is dispensed to the occupant. A supply of video cassettes, commensurate with the expected use of the booth during a predetermined time period, is contained within the booth. Dispensing apparatus serially dispenses one of the video cassettes to a recorder associated with the television camera for recording the images and any accompanying sound upon the video cassette. On completion of the recording session, the video cassette is dispensed from the recorder to a location accessible to the occupant. The video cassette produced may be used as a form of communication by forwarding same to a third party or it may be used as a record to depict an event in the life of the occupant.

It is therefore a primary object of this invention to provide a video recording booth for use by members of the general public.

Another object of the present invention is to provide a coin actuated video recording booth.

Yet another object of the present invention is to provide a recording booth for making a video recording on a video cassette and dispensing the cassette on conclusion of the recording session.

Still another object of the present invention is to provide apparatus for loading a video recorder with a video cassette and for dispensing the video cassette on conclusion of a recording session.

A further object of the present invention is to provide coin operated apparatus for recording a live performance upon a video cassette, which cassette is dispensed at the conclusion of the recording session.

A yet further object of the present invention is to provide apparatus for storing, recording and dispensing video cassettes in conjunction with a television recording session.

A still further object of the present invention is to provide a method for inexpensively creating a video recording on a video cassette of a live performance.

A still further object of the present invention is to provide a method for storing, transporting and dispensing video cassettes used in conjunction with a video and audio recording session.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 2 is an isometric view of stacking and dispensing apparatus for video cassettes;

FIG. 3 is a partial side view illustrating the dispensation of video cassettes;

DESCRIPTION OF THE PREFERRED EMBODIMENT

Figure 1:
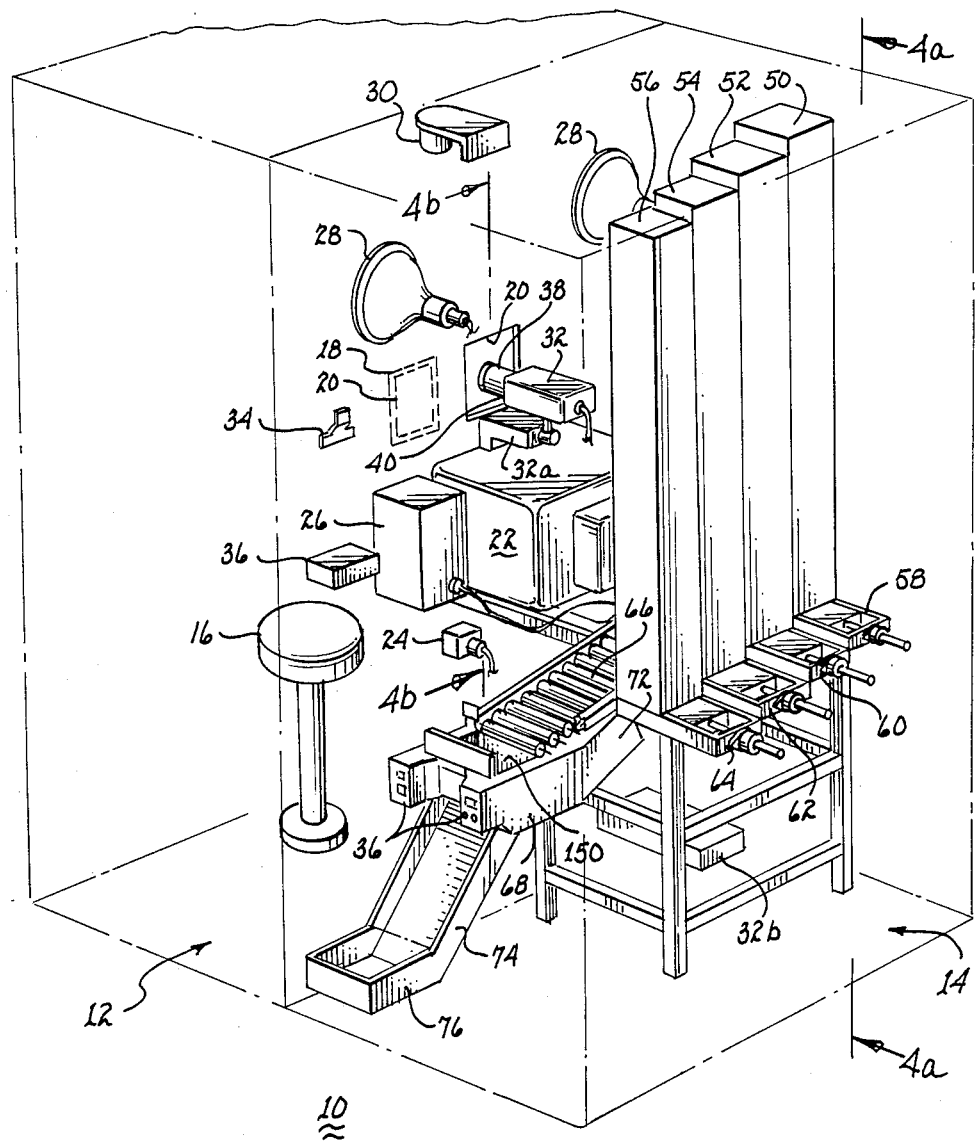
FIG. 1 is a partially cut away view of a television recording booth.
Figures 4A, 4B:
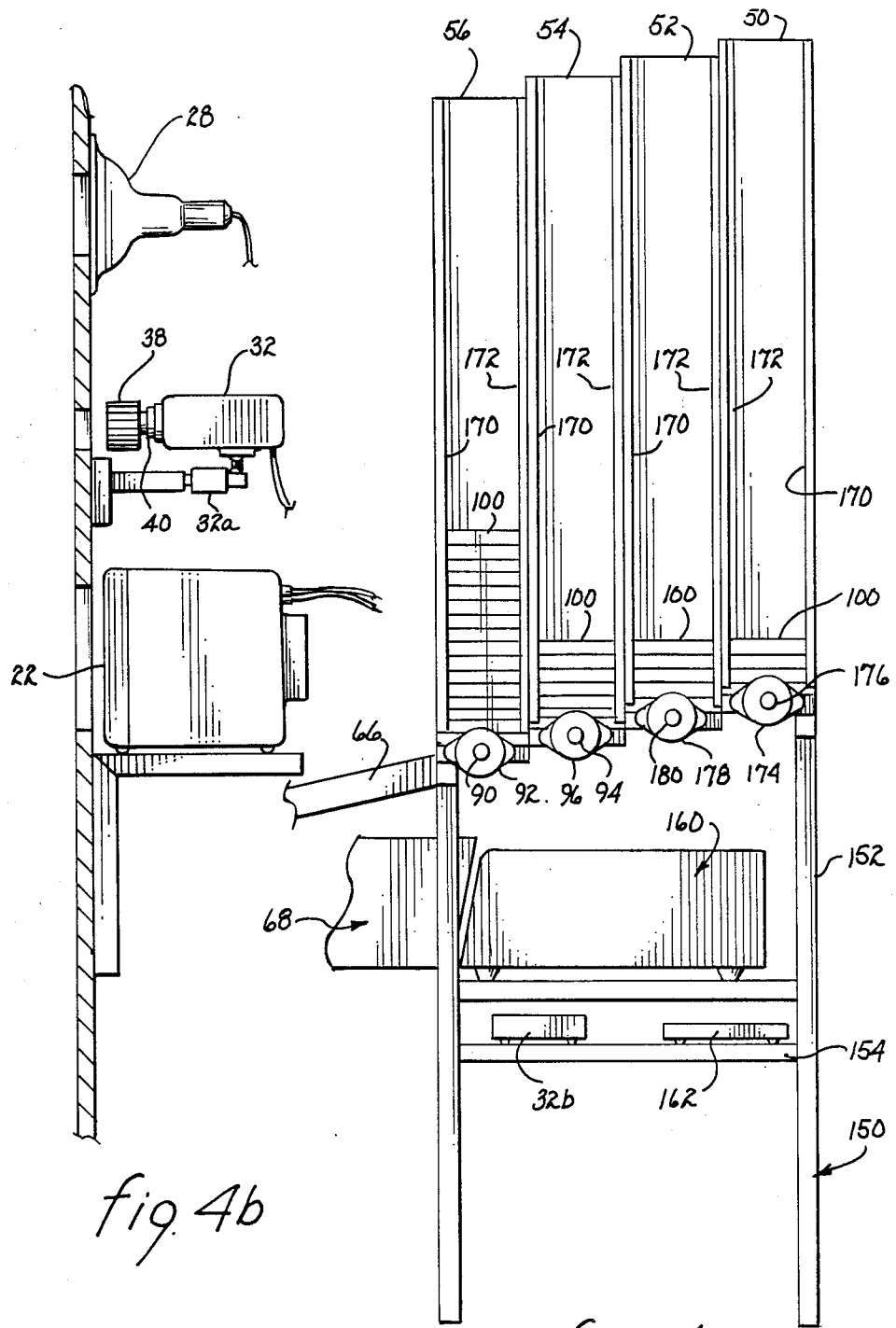
FIG. 4a is a side view taken along lines 4a—4a, as shown in FIG. 1, of the stacked video cassettes
FIG. 4b is a partial side view taken along lines 4b—4b, as shown in FIG. 1, of recording related equipment.

Referring jointly to FIGS. 1 and 4b, there is shown a booth 10 having a recording studio 12 and an equipment compartment 14. The recording studio includes a door (not shown) for access and privacy within the studio and a stool 16 (a bench may also be used) for use by an occupant. A mirror 18 permits the occupant to view within frame 20 what the television camera will record. A monitor screen 22 can be set to depict, in real time, the image being recorded. It may also be used to play back the recording. A microphone 24 and speaker 26 may be mounted behind grills or the like. Flood lights 28 and overhead light 30 provide illumination sufficient for television camera 32 to sense the images to be recorded. The television camera 32, mounting bracket 32a and power drive unit 32b may be a Panasonic Video Camera, Model No. WVCD110 A/KT having a lens 38, such as Toyo Camera Lens Model No. 08815C. The lens may be attached to the camera with a mount 40 of the type known as a Panasonic Camera C Mount Adapter, Model No. WV AD 20. A clip 34 or the like may be located adjacent mirror 18 to hold cue cards or the like. A control panel 36 permits the occupant to control the beginning and ending of the recording session; it may be adapted to accept payment.

Equipment compartment 14 includes four stacks 50, 52, 54 and 56 of video cassettes. To prevent failure of operation of the booth, all four stacks are programmed to dispense, by operation of dispensing apparatus 58, 60, 62 and 64, simultaneously four video cassettes onto conveyor 66. These cassettes are dispensed from the conveyor and received in an automatic cassette changer, as needed. After the last of any set of four video cassettes are received by the automatic cassette changer, another set of four video cassettes are dispensed from the stacks. Alternatively, dispensing apparatus 58, 60, 62 and 64 selectively dispense onto conveyor 66 a video cassette from one of the stacks. The conveyor transports the dispensed video cassette to the automatic cassette changer, such as a Panasonic Auto Cassette Changer, Model No. AC CL68. After receipt of a video cassette, the cassette changer loads the video cassette in recorder 72, such as Panasonic Duplicating Recorder, Model No. AG6651. After loading of a video cassette and initiation of appropriate commands in control panel 36, television camera 32 will be energized. Simultaneously, monitor screen 22, which may be any conventional television receiver, may be used to produce a real time duplicate of the image captured by the television camera. On completion of the recording, the video cassette is rewound and played back on the monitor screen; the replay may be automatic or at the election of an operator. Other variations of the recording time, play back, real time monitoring, etc. may be incorporated. After playback, the video cassette is rewound. However, the following procedure is the preferred mode of operation. At any time prior to the full elapsed time that the operator selected before the recording begins, the operator may push a control button and terminate the recording time. At such time, recorder 72 will rewind the video cassette, monitor screen 22 will be energized and the actual recording will be played back for viewing by the operator. If the full time that was selected by the operator for recording elapses without termination by activating a control button, the recorder will automatically rewind the video cassette, the monitor screen will be energized and the actual recording will be played back for the operator's viewing on the monitor. On completion of the playback, the recorder 72 will rewind the cassette. After the video cassette has been rewound, cassette changer 68 is energized to retrieve the video cassette from the recorder and to dispense the video cassette. The video cassette is transported along chute 74 to platform 76 where it may be retrieved.

Referring jointly to FIGS. 2 and 3, the structure and operation of cassette storage and dispensing apparatus 48 will be described in further detail. Stacks 50, 52, 54 and 56 each store a plurality of stacked video cassettes, which video cassettes are selectively or simultaneously dispensed through ports 80, 82, 84 and 86 respectively.

The dispensing apparatus associated with each of the stacks includes a plunger, such as plunger 88 illustrated in conjunction with dispensing apparatus 64. The plunger is translated by conventional operation of a jack screw 90 rotated in response to energization of motor 92. Dispensing apparatus 62 includes a similar jack screw 94 actuated by motor 96. Translation of plunger 88 in a first direction results in singular engagement with a video cassette 100, the bottom most video cassette within stack 56, and translation of such video cassette through port 86 onto conveyor 66. Thereafter, plunger 88 is retracted in a second direction. Upon retraction, the stack of cassettes within stack 56 drops down to position the next video cassette ready for discharge through port 86 in response to movement of plunger 88 in the first direction. This procedure may occur sequentially, serially or simultaneously in one or all of the stacks, as discussed above.

Conveyor 66 includes a frame 102 having a pair of parallel longerons 104, 106 for rotatably supporting a plurality of rollers 108. Longerons 104, 106 are slanted with respect to horizontal to provide an inclined plane represented by rollers 108 for encouraging translation of a discharged video cassette along the rollers toward the lowered discharge end 110 of frame 102. To maintain the video cassettes upon rollers 108, an end wall 112 may be disposed at upper end 114 of the frame and a side wall 116 extends upwardly from longeron 106 adjacent the corresponding end of the rollers and to a point past end 110 of frame 102. A side wall 118 extends upwardly from longeron 104 from a point generally adjacent stack 56 to a point past end 110 of the frame and generally adjacent the corresponding end of rollers 108. End 110 of frame 102 for conveyor 66 terminates generally coincident with the boundary of input port 150 (see FIG. 1) of cassette changer 68. Thereby, transport of a cassette 100 along the conveyor will result in discharge of the video cassette at end 110 of the conveyor into the input port of the cassette changer.

As shown in FIG. 3, stack 50 includes an opposed pair of shoulders 130, 132 for supporting the bottom most one of the video cassettes stacked within the stack. In addition, side 134 (see FIG. 2) of stack 50 may be a section of sheet material or may include a pair of inwardly oriented lips 136, 138 to maintain the video cassettes stacked. The remaining sides may be similarly configured. Lower edges 140, 142 of these lips define port 80 in combination with shoulders 130, 132. Each of stacks 52, 54 and 56 include similar shoulders and may include side walls as either planar side walls, as illustrated in FIG. 2, or as the lips described above with respect to stack 50; for brevity's sake, a detailed description thereof will not be repeated.

A framework 150 includes a plurality of uprights 152 for supporting and positioning a number of structures, including frame 102 for conveyor 66 and a shelf 154. Recorder 72 may be mounted upon shelf 154 in operative relationship with changer 68. In this relationship, the recorder receives a video cassette from the changer and records thereon the image captured by television camera 32 (see FIG. 1). On termination of the recording, the video cassette is transferred from recorder 72 to changer 68. The changer discharges the video cassette into chute 74, as described above. A further shelf 156 is supported by uprights 152 and provides a mounting surface for various components 162, 164 associated with operation of the present invention.

Referring to FIG. 4a, further details of the cassette storing stacks and operation thereof will be described. The rear side of each of stacks 50, 52, 54 and 56 may be formed of sheet material, as illustrated for side wall 134 in FIG. 2 for the front side. Alternatively, each of the rear side walls may include opposed inwardly extending pairs of lips 170, 172, as illustrated. Like stacks 54, 56 described above, stack 50 includes a motor 174 for rotatably actuating a jack screw 176. Stack 52 includes a similar motor 178 for rotatably actuating a jack screw 180. As a function of the control circuitry, one of motors 92, 96, 174 and 178 is energized to bring about translation of its jack screw. The translating jack screw will reposition the respective plunger in the first direction to discharge the lower most one of video cassettes 100 in the respective stack. Thereafter, the motor will reverse direction to retract the jack screw and relocate the plunger in an opposite second direction. When the video cassettes are dispensed serially, the particular selection of the stack from which a cassette is to be discharged is a function of the control circuitry based upon an attempt to maintain the number of video cassettes in each stack equal or an attempt to empty one stack at a time.

Figure 5:
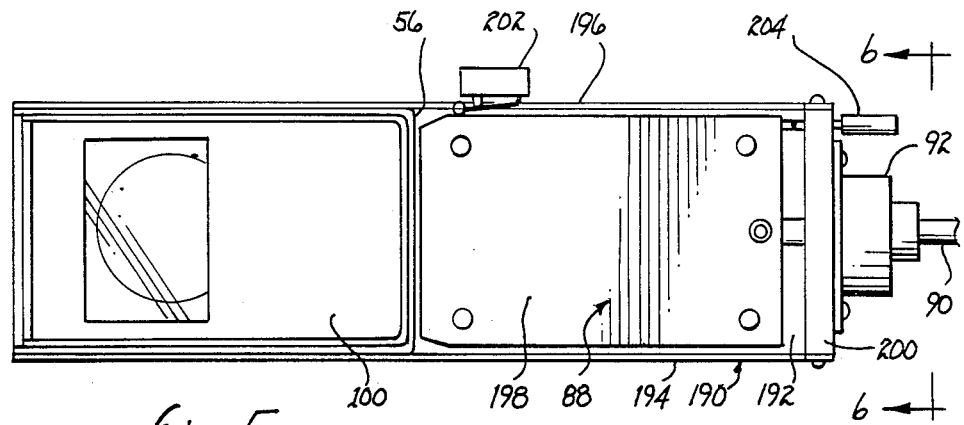
FIG. 5 is a cross sectional view taken along lines 5—5, as shown in FIG. 2.
Figure 6:
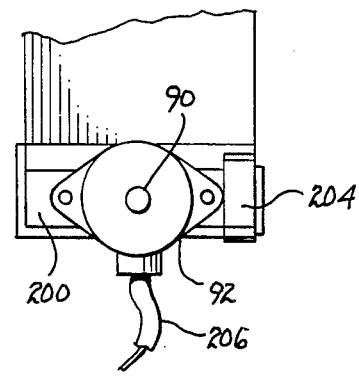
FIG. 6 is an end view taken along lines 6—6, as shown in FIG. 5.
Figure 7:
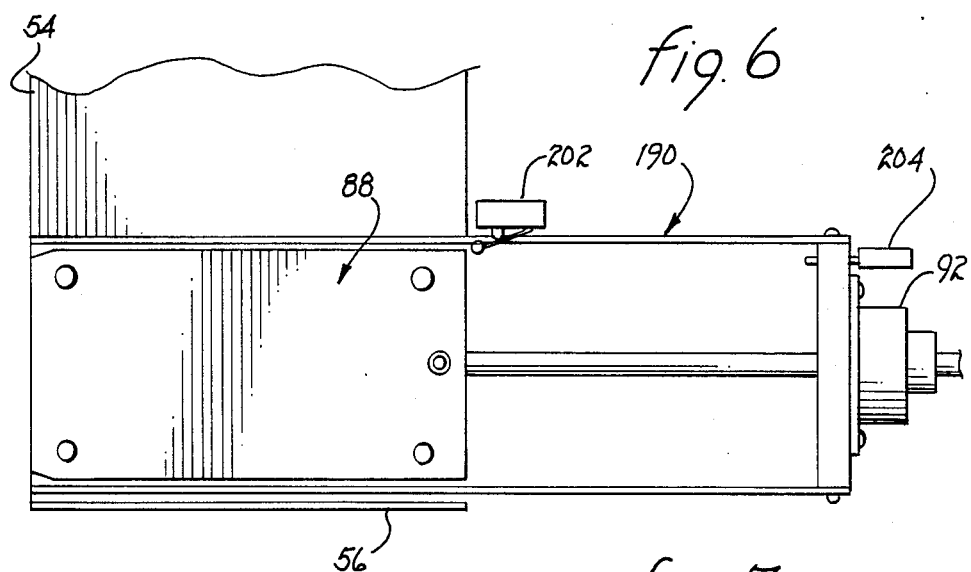
FIG. 7 is a top view of the apparatus for translating a video cassette from a stacker.

Referring jointly to FIGS. 5, 6 and 7, the apparatus and operation attendant discharge of a video cassette will be described in further detail. Video cassette 100, represented as being the bottom most video cassette in stack 56, will be acted upon by plunger 88. The plunger is positioned within and guided by a trough 190 having a bottom 192 and sides 194, 196. The plunger is dimensionally equivalent in cross section to video cassette 100. Additionally, it includes an upper surface 198 of essentially planar configuration to ensure that the next upwardly located video cassette within stack 56 will not impede or interfere with sliding movement of the plunger therebeneath while the plunger supports the upwardly extending stacked video cassettes. End wall 200 of the trough supports motor 92 and jack screw 90 retractably extendable therethrough.

Upon energization of motor 92, jack screw 90 is extended toward video cassette 100 resulting in commensurate rectilinear translatory movement of plunger 88. On contact with the rear edge of the video cassette, the plunger will apply a force to the video cassette resulting in commensurate translatory movement of the video cassette through port 86 of stack 56 and on to conveyor 66 (as shown in FIG. 2). Necessarily, as shown in FIG. 7, plunger 88 must extend through the stack a sufficient distance to ensure release of the video cassette from within the stack. Limit switches 202, 204, and the like, may be employed to generate electrical control signals indicative of the position of plunger 88 or other elements. Such control signals in turn regulate energization of motor 92. Moreover, the control signals can be adapted to provide an indication of the direction of rotation of the motor to obtain selected extension and retraction of jack screw 90. As shown in FIG. 6, power to motor 92 may be by means of electrical conductors within cord 206.

Figure 8:
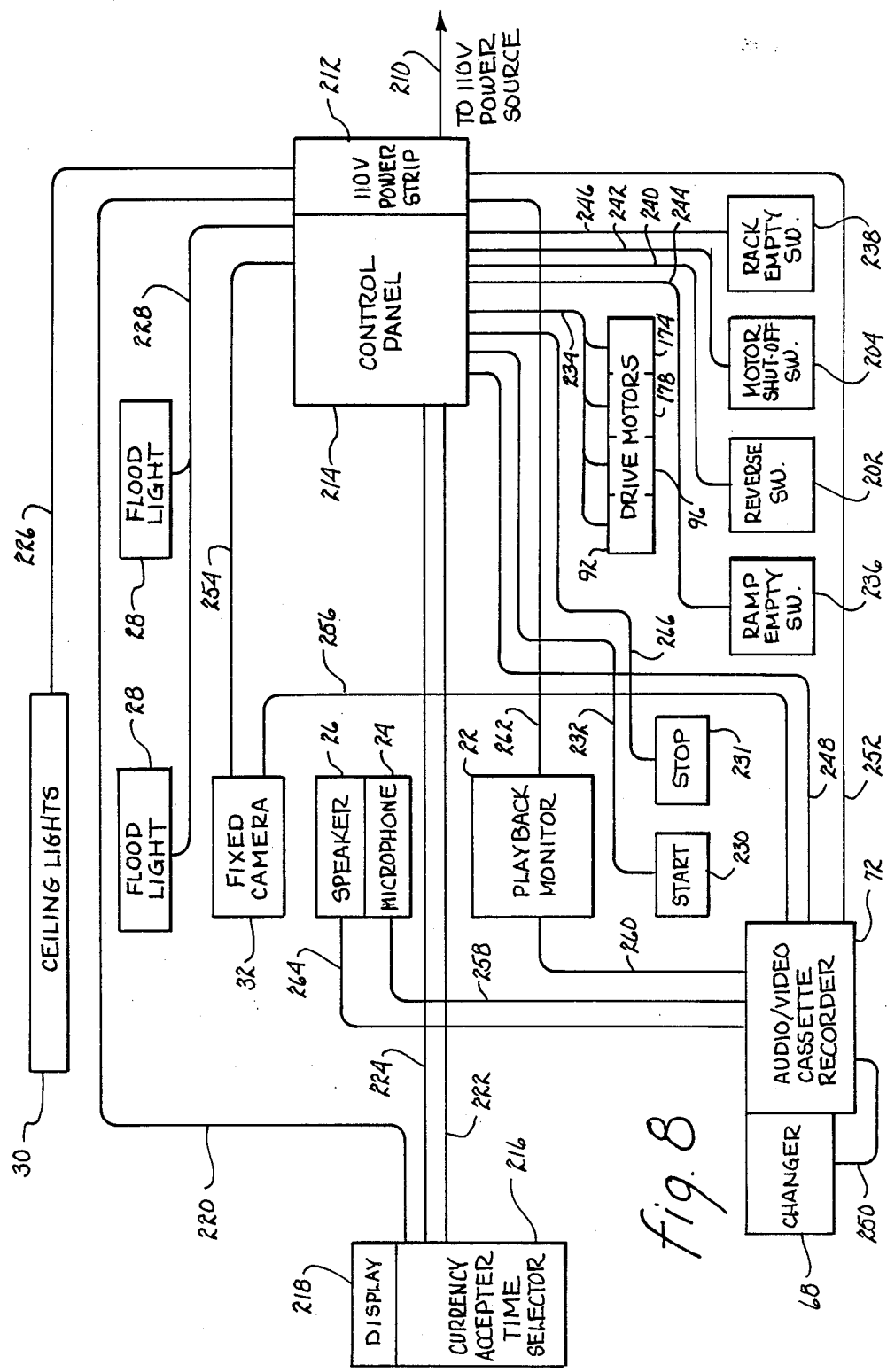
FIG. 8 is a schematic of a control system.

Referring to FIG. 8, there is shown a representative schematic for a circuit useful to operate the present invention. A source of power is provided to booth 10 through an electrical conductor 210, which conductor provides power to a power strip 212. The power strip is electrically associated with a control panel 214, which panel selectively provides power to various components in response to a predetermined sequence and/or various input signals. To initiate a recording session within booth 10, coins or currency are deposited within a currency acceptor unit 216, which may be a part of control panel 36 shown in FIG. 1. A display 218 may be associated therewith to provide a user with cost information relating to time of the recording session or other information. Power to the display and the currency acceptor may be provided through electrical conductor 220. Upon acceptance of coins or currency, the currency acceptor provides a control signal through electrical conductor 222 to control panel 214. A second electrical conductor 224 may provide feedback information to the currency acceptor as a function of termination of the recording session or other information useful to a user. Ceiling light 30 may be continuously energized during normal hours of operation of booth 10 via electrical conductor 226. Upon initiation of a recording session, flood lights 28 are energized by the control panel through electrical conductor 228.

When the user is ready to begin the recording session, start button 230 (which may be a part of control panel 36) is actuated. It provides a control signal to control panel 214 through electrical conductor 232. A control signal is supplied to one of drive motors 92, 96, 178 or 174 through electrical conductor 234 to bring about discharge of a video cassette from within one of stacks 50, 52, 54 or 56 to conveyor 66 and into changer 68. Control of the energized one of the drive motors is provided by one of limit switches 202, 204, 236 and 238 through electrical conductor 240, 242, 244 or 246, respectively. Commensurate therewith, a control signal is transmitted to recorder 72 through electrical conductor 248 and to changer 68 through electrical conductor 250. Electrical power for both of these units is provided through electrical conductor 252.

To initiate a recording, a control signal is transmitted to television camera 32 through electrical conductor 254; a commensurate control signal may be transmitted between the television camera and recorder 72 through electrical conductor 256. Sound for the recording being made is provided through microphone 24 communicating with recorder 72 through electrical conductor 258.

Subsequent to the recording session, the video and audio recorded may be played back upon monitor 22 in response to control signals transmitted through electrical conductor 260. Power for the monitor may be provided by electrical conductor 262. The recorded sound may be broadcast by speaker 26 energized through electrical impulses transmitted via electrical conductor 264. During the recording session, the recording may be halted by a user actuating stop button 231 which transmits a control signal to control panel 214 through electrical conductor 266; the stop button may be a part of control panel 36. In the alternative, the control panel may be set to permit interruption and resumption of the recording session with selective play back.

On termination of the recording session, as may be determined by the time selected at currency acceptor 216, appropriate control signals are transmitted through electrical conductor 248 to recorder 72 and therefrom to television camera 32 and microphone 24. Furthermore, changer 68 is energized in response to control signals transmitted via electrical conductor 250 to discharge the cassette containing the recording. Flood lights 28 may be shut off through de-energization of an electrical conductor 228. In addition, appropriate indicia signifying termination of the recording session may be displayed to the user.

It is to be understood that the circuit diagram illustrated in FIG. 8 is representative of a working circuit. However, different sequencing, mode of energization and differently initiated control signals may be employed.

While the principles of the invention have now been made clear in an illustrative embodiment, there will be immediately obvious to those skilled in the art many modifications of structure, arrangement, proportions, elements, materials and component used in the practice of the invention which are particularly adapted for specific environments and operating requirement without departing from those principles.

What is claimed is:

1. A booth for making a video recording on a video cassette, said booth comprising in combination:
   (a) a recording studio for accommodating at least an occupant of whom the recording is to be made;
   (b) an equipment compartment for housing the apparatus for making the recording of the occupant of said recording studio;
   (c) said equipment compartment including:
      (i) a television camera for capturing an image of the occupant of said recording booth;
      (ii) a recorder for recording the image captured by said television camera upon the video cassette;
      (iii) a changer for loading and unloading said recorder with the video cassette;
      (iv) at least one stack of video cassettes and including means for serially dispensing the video cassettes from each of said at least one stack to said changer;
      (v) means for discharging the video cassette from said changer to a recipient; and
   (d) means for controlling the operation of said television camera, said changer, said recorder and said stack.

2. A booth as set forth in claim 1 wherein said recording studio includes means for illuminating the occupant during a recording session.

3. A booth as set forth in claim 1 wherein said recording studio includes means for presenting an image to the occupant representative of the image captured by said television camera.

4. A booth as set forth in claim 1 wherein said recording studio includes means for providing a replay of the recording contained on the video cassette.

5. A booth as set forth in claim 1 wherein said equipment compartment includes means for recording an audio signal concurrently with the image captured by said television camera.

6. A booth as set forth in claim 1 wherein said stack includes means for serially dispensing a video cassette on command of said controlling means, said equipment compartment including means for conveying a video cassette dispensed from said stack to said changer.

7. A booth as set forth in claim 6 wherein said discharging means includes a chute extending from said changer to a point of access for delivery of the video cassette containing the recording.

8. A booth as set forth in claim 1 wherein said stack includes a plurality of stacks, each stack of said plurality of stacks being adapted to house a plurality of stacked video cassettes, each stack of said plurality of stacks including said means for serially dispensing a video cassette on command of said controlling means, said equipment compartment including means for conveying each video cassette dispensed from any one stack of said plurality of stacks to said changer.

9. A booth as set forth in claim 8 wherein said discharging means includes a chute extending from said changer to a point of access for delivery of the video cassette containing the recording.

10. A booth as set forth in claim 8 wherein each stack of said plurality of stacks includes a plunger, means for translating said plunger in a first direction to extend said plunger and to effect dispensation of a video cassette and in a second direction to retract said plunger.

11. A booth as set forth in claim 10 wherein said plunger includes means for slidably supporting the remaining video cassettes stacked within the respective stack during translation of said plunger in the first and second directions.

12. A booth as set forth in claim 11 wherein said translating means includes a jack screw and motive means for rotating said jack screw in each direction to effect translation of said plunger.

13. A booth as set forth in claim 8 wherein each stack of said plurality of stacks includes a port through which a video cassette is dispensed and wherein said conveying means includes a conveyor extending past each of said ports for receiving a dispensed video cassette.

14. A booth as set forth in claim 13 wherein said conveyor includes a plurality of rollers and opposed side walls for guiding each conveyed video cassette along said plurality of rollers.

15. A method for making a video recording on a video cassette, said method comprising the steps of:
   (a) providing a recording studio to accommodate a subject of the video recording;
   (b) housing the equipment for making the video recording in an equipment compartment proximate the recording studio;
   (c) capturing with a television camera an image of the subject of the video recording;
   (d) recording on the video cassette with a recorder the image captured by the television camera;
   (e) loading and unloading the recorder with the video cassettes automatically through operation of a changer in response to control signals prior to and subsequent to operation of said recording step;
   (f) dispensing a video cassette from at least a stack of video cassettes to the changer and prior to said step of recording;
   (g) discharging the video cassette from the changer to a point of access for a recipient on completion of said steps of recording and unloading.

16. A method as set forth in claim 15 including the step of initiating serial operation of steps c to g in response to a command executable by the subject of the recording session.

17. A method as set forth in claim 15 wherein said step of dispensing includes the step of conveying each video cassette from the stack of video cassettes to the changer.

18. A method as set forth in claim 17 wherein said step of dispensing further includes the step of translating a plunger in a first direction to dispense a video cassette from the stack of video cassettes and in a second direction to relocate the plunger in preparation for further dispensation of video cassettes.

19. A method as set forth in claim 15 wherein a plurality of stacks of video cassettes are disposed in the equipment compartment and wherein said step of dispensing includes the step of dispensing a video cassette from a selected one of the stacks of video cassettes.

20. A method as set forth in claim 19 wherein said step of dispensing includes the step of conveying a video cassette from the dispensing one of the stacks of video cassettes to the changer.

21. A method as set forth in claim 20 wherein said step of conveying includes the step of supporting the video cassettes upon a plurality of rollers, which rollers define a downwardly inclined path to encourage travel of the dispensed video cassette thereacross.

22. A method as set forth in claim 15 wherein said step of dispensing includes the step of simultaneously dispensing a video cassette from each of the stacks of video cassettes.

23. In a booth for making a video recording on a video cassette of a subject located within a studio with a television camera operably associated with a video cassette recorder loaded and unloaded by a changer, a source of video cassettes, source of video cassettes comprising in combination:
 (a) at least one stack of video cassettes;
 (b) means for dispensing video cassettes from said stack, each said dispensing means including a plunger and means for translating said plunger; and
 (c) means for conveying a dispensed video cassette to the changer, said conveying means including a plurality of rollers defining a downwardly inclined path from said stack to said changer.

24. A booth as set forth in claim 23 including a plurality of stacks of video cassettes, each stack of said plurality of stacks including a port through which a video cassette is dispensed onto said conveying means.

25. A booth as set forth in claim 23 including means for discharging a video cassette from the changer to a point of access to a recipient.

26. A booth as set forth in claim 25 wherein said discharging means comprises a chute.

27. A booth as set forth in claim 23 wherein said conveying means includes a pair of side walls for guiding the dispensed video cassette along said rollers.

28. A booth as set forth in claim 23 wherein said translating means includes a jack screw operatively associated with said plunger, motive means for rotating said jack screw and control means for energizing and deenergizing said motive means.

29. A booth as set forth in claim 23 including control means for selectively actuating the television camera, the recorder, the changer and said dispensing means.

30. A booth as set forth in claim 23 wherein said dispensing means includes means for dispensing video cassettes simultaneously from each of said stacks.

* * * * *